J. W. WHITE.
VEHICLE HEADLIGHT CONTROL.
APPLICATION FILED OCT. 7, 1920.
1,400,117.
Patented Dec. 13, 1921.
2 SHEETS—SHEET 2.
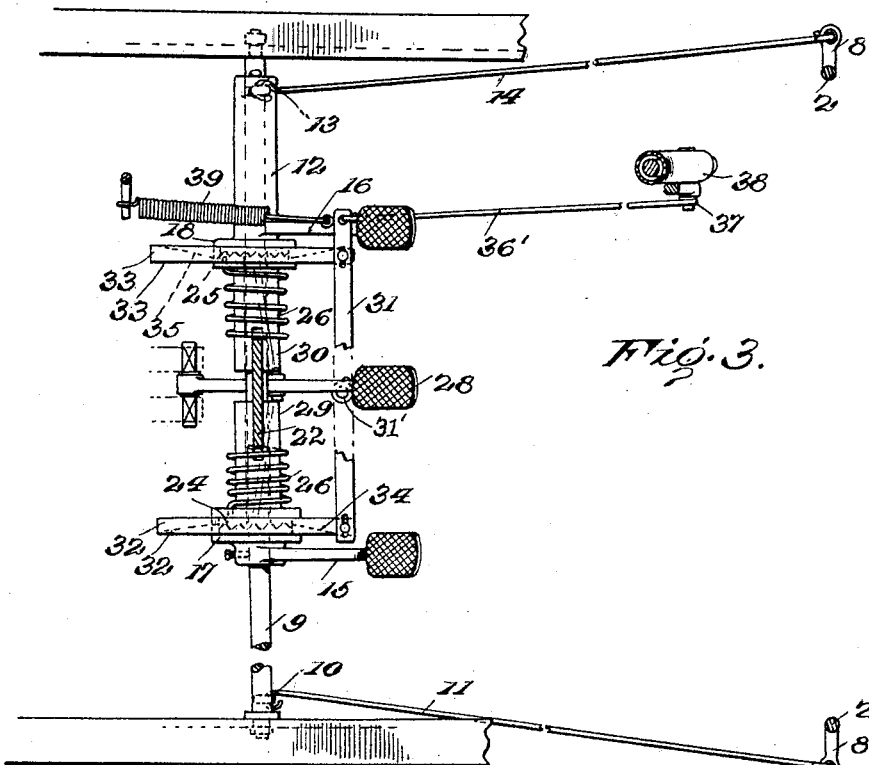
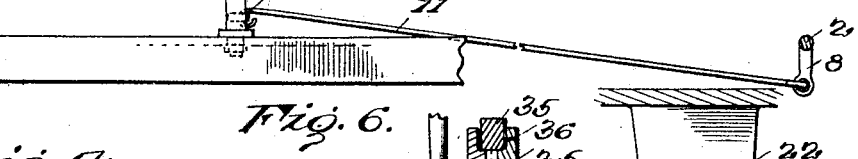
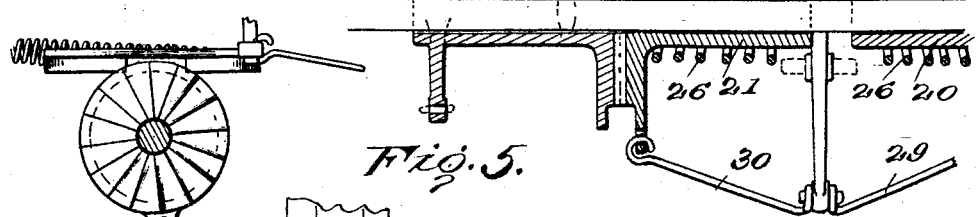
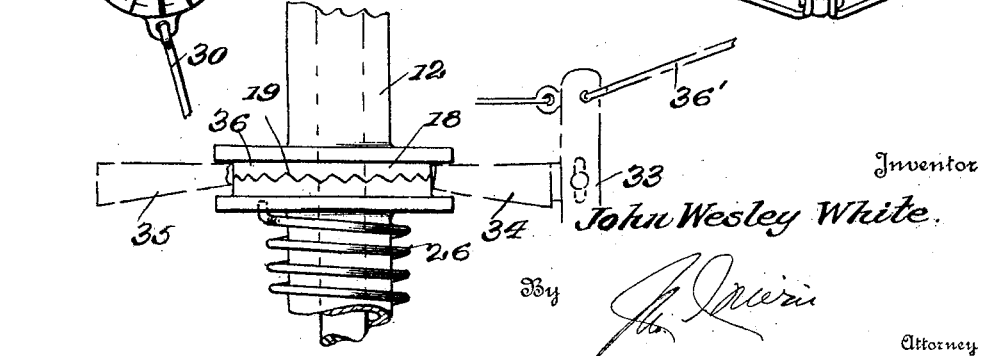
Inventor
John Wesley White.
By
Attorney

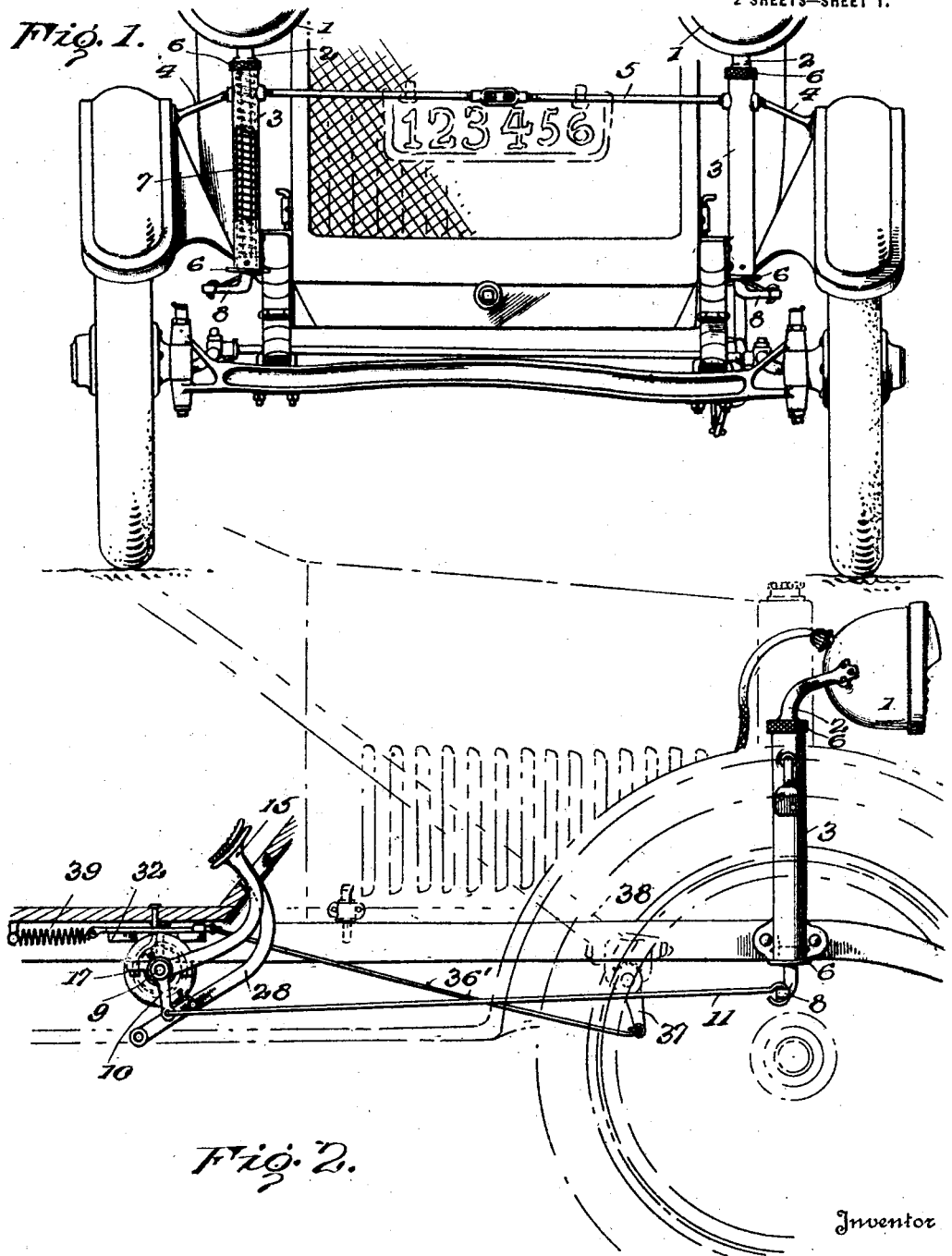

UNITED STATES PATENT OFFICE.

JOHN WESLEY WHITE, OF LEWISTOWN, MONTANA.

VEHICLE-HEADLIGHT CONTROL.

1,400,117. Specification of Letters Patent. Patented Dec. 13, 1921.

Application filed October 7, 1920. Serial No. 415,414.

*To all whom it may concern:*

Be it known that I, JOHN WESLEY WHITE, a citizen of the United States, residing at Lewistown, in the county of Fergus and State of Montana, have invented certain new and useful Improvements in Vehicle-Headlight Controls, of which the following is a specification.

This invention relates to an improvement in headlight control for vehicles, wherein the headlights may be individually governed at the will of the driver to indicate a contemplated movement of the vehicle.

The present invention is directed to mounting the headlights for turning at the will of the driver and in accordance with a contemplated turn of the vehicle, the operated headlight being held in turned position until the turning operation of the automobile is initiated, whereupon such turned headlight is automatically released and returned to normal position.

Through the use of such a system, the driver can indicate to approaching vehicles, pedestrians, and traffic officers a contemplated turn, and thus the time and trouble incident to the prevalent hand signaling is avoided, to say nothing of affording the driver better control over the vehicle through the use of both hands. In closed cars, where hand signaling is difficult if not impossible the improved system will be found most effective.

The invention is illustrated in the accompanying drawings, wherein:—

Figure 1 is a front elevation illustrating the mounting of the headlights for the purposes of this invention.

Fig. 2 is a view in side elevation illustrating the operating means for the headlights.

Fig. 3 is a plan of the same.

Fig. 4 is a view in front elevation of the locking means.

Fig. 5 is an enlarged top plan of the same, the wedges being broken off at the ends to show the disk enlargements.

Fig. 6 is a section through the locking means.

In the accompanying drawings, 1 represents the usual headlights, which for the purposes of this invention are secured upon the upper ends of hollow standards, preferably turned forwardly at the upper ends. The standards 2 are mounted in cylindrical supports 3, secured to the vehicle at the lower ends, and braced at the upper ends through rods 4 secured to said supports and to the wheel fenders, and an intermediate rod 5, between and fixed to both supports. The standards 2 pass through upper and lower caps 6 on the respective ends of the standard supports 3, and within said supports are secured to one end of a coil spring 7, the opposite end of which is secured to the support. The springs 7 are tensioned to normally hold the headlights in normal, that is straight-ahead positions, any turning movement of the headlights placing the springs under tension tending to return the headlight so turned to normal.

The lower ends of the standards 2 extend below the supports 3, and are provided with lateral arms 8, for connection with suitable operating means. A shaft 9 is mounted transverse the frame of the vehicle below and in rear of the usual removable footboard (not shown) and one end of this shaft is provided with an integral arm 10, connected by a connection 11 to the arm 8 of one headlight. A sleeve 12 is rotatably supported on the shaft 9 at the end opposite the arm 10, such sleeve being provided with an arm 13, connected as at 14 to the arm 8 of the other headlight. Thus through turning movement of the shaft 9 or sleeve 12, the particular headlight may be turned as desired to indicate a contemplated turn of the vehicle. Of course the headlights are capable of turning in one direction each through the connections described, that is the right-hand headlight may be turned toward the right, while the left headlight may be turned toward the left.

A foot pedal 15, with an operative end extended through the floor of the vehicle within convenient reach of the driver, is secured on the shaft 9, so that on depression of such pedal the shaft, and therefore the headlight connected thereto will be turned. A similar foot-pedal 16 is connected to the sleeve 12, to correspondingly operate the other headlight. Both pedals are provided at their pivotal ends with disk enlargements, as 17 and 18, which enlargements are serrated on one face, as at 19.

A locking means is provided to hold an operated pedal in operated position, such comprising sleeve members 20, 21 loosely encircling the shaft 9 between the pedals 15 and 16, and held against rotation through a key 22 secured to the underside of the floor of the vehicle, though such sleeve members are freely slidable lengthwise the shaft 9. The ends of the sleeve members are formed with serrated disk portions, as 24 and 25, which are normally in direct engagement with the serrated disk ends 17 and 18 of the pedals. Springs 26 bearing between the disk portions 24, 25, and a fixed stop formed by the key 22, serve to hold the disk portions in engaging contact with the serrated end portions of the pedals. Thus with either pedal operated the serrated end portion thereof will override the coacting disk portion of the particular sleeve member, and such pedal, and therefore the headlight, will be held in the operated position.

A release pedal 28 is pivotally connected to the floor of the vehicle in rear of the holding means, and has its operative end extended through the floor of the vehicle, preferably between the pedals 15 and 16. Rods 29 and 30 are connected to the release pedal and to the respective disk portions 24 and 25, so that on operation of the release pedal the operated pedals for turning the headlights are released, and the headlight or headlights permitted to return to normal position through the operating spring 7.

It is of importance, however, that means be provided whereby the operated headlight may be automatically released in the turning operation of the vehicle, as having signaled such an intention, the use of the signal may be dispensed with when the vehicle is operated to make the turn.

Such automatic release means must of course be controlled through the steering mechanism, so that as such mechanism is operated to turn the vehicle, the headlight signaling such turn may be permitted to return to normal. For this purpose a lever 31 is pivotally mounted at 31' on the underside of the vehicle floor, and on each side of said pivot the lever is pivotally connected with bars, as 32, 33, which are each provided with oppositely acting wedge blocks 34, 35. These blocks, in the movement of the lever in one direction or the other will move between the disk portions of the holding sleeve and the serrated end portions of the levers, and force the disk portions to a position to release the foot pedals held in operated position. If desired, and as contemplated, the disk portions of the holding sleeves and the serrated ends of the foot pedals may be cut away, as at 36 to permit operation of the wedge blocks.

The end of lever 31 is connected by a flexible connection 36' with an arm 37 projecting from the steering post 38, so that in operation of such post to turn the vehicle, the heretofore operated pedal will be released. A spring 39 connected to the lever 31 and to the vehicle frame operates the lever 31 in the opposite direction with the same release effect, in the opposite turning movement of the steering post.

The connection 36' may be led in any convenient way to accomplish the object sought, being given a return over guide pulleys in the event the operation of a particular type of steering post requires such construction.

It is apparent from the above description that from the above construction, the headlight indicating a contemplated turn may be operated by the driver and locked in such position until released through the operation of the release pedal, or automatically released through the start of the turning movement of the vehicle. Thus the headlights are in effect used as a signaling means, and are always in normal positions except when used for the purpose described.

The various parts of the structure can be readily placed on any motor car, and such parts when arranged as described will in no wise interfere with any other operating parts, nor be in the way when such other parts are to be reached for repair or adjustment.

Having thus described the invention, what is claimed as new, is:—

1. Dirigible head lights, a foot pedal for turning each head light to signal a contemplated turn of the vehicle, automatic locking means for securing an operated pedal in operated position, and a single pedal to release all operated pedals at will.

2. Dirigible head lights, foot pedals for turning same, independent means for locking each operated foot pedal in operated position, a steering post, means for release actuation of both of said locking means in movement of the steering post in one direction, and an independent element for actuating the locking means to release the pedals in movement of the steering post in the opposite direction.

3. Dirigible head lights, a foot pedal for turning each head light, a locking means for each operated pedal when in operated position, means for releasing said locking means, a steering post, a connection from the post to actuate said locking release means in movement of the post in one direction, and a spring for operating the locking release means in the movement of the steering post in the opposite direction.

4. Dirigible headlights, foot pedals for turning same, each of said pedals having serrated disk ends, sleeve portions having disk portions to engage said serrated disk ends, whereby in the operation of a pedal the coöperation of its disk end with the disk portion of the sleeve will hold said pedal in operated position, and a pedal to operate such sleeves to disengage the disk portions thereof from the disk ends of the pedals to release the pedals.

5. Dirigible headlights, foot pedals connected to such headlights to turn the same, serrated disk ends on the pedals, sleeve members having serrated disk portions to engage the pedal disk ends to hold the pedals in operated position, a wedge member to release such connection, and a connection between such wedge member and the steering post of the vehicle, whereby to release an operated pedal in the operation of the steering post.

6. Dirigible headlights, foot pedals connected therewith, holding means for the pedals when operated, wedge means for releasing the holding means, a connection between said wedge means and the steering post for operating said wedge means in actuation of the steering post in one direction, and a spring for operating the wedge means in another direction of turning movement of the steering post.

7. Dirigible headlights, a foot pedal connected to each headlight for turning the same in one direction, holding means for an operated foot pedal, a lever, double wedge means carried by the lever to release the holding means in movement of the lever in either direction, a connection between the lever and steering post of the vehicle to operate the lever in one direction in movement of the post in one direction, and a spring for operating the lever in the opposite direction in the movement of the post in the opposite direction.

In testimony whereof I affix my signature.

JOHN WESLEY WHITE.